UNITED STATES PATENT OFFICE.

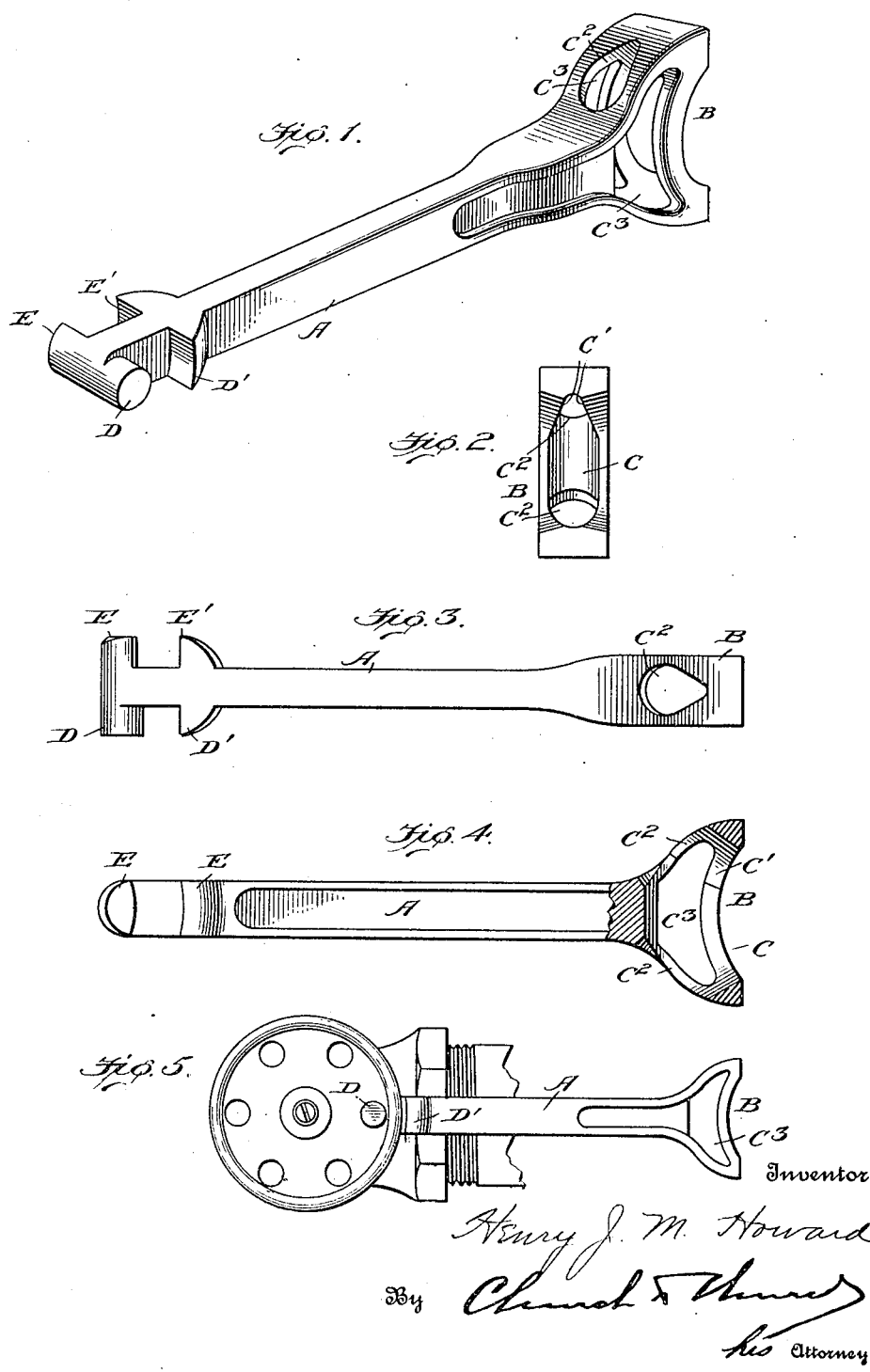

HENRY J. M. HOWARD, OF WASHINGTON, DISTRICT OF COLUMBIA.

SPANNER FOR HOSE-PIPE COUPLINGS.

1,207,046.   Specification of Letters Patent.   Patented Dec. 5, 1916.

Application filed May 18, 1916. Serial No. 98,382.

*To all whom it may concern:*

Be it known that I, HENRY J. M. HOWARD, a citizen of the United States, residing at Washington, in the District of Columbia, have invented certain new and useful Improvements in Spanners for Hose-Pipe Couplings; and I do hereby declare the following to be a full, clear, and exact description of the same, reference being had to the accompanying drawings, forming part of this specification, and to the figures and letters of reference marked thereon.

The object of the present invention is to provide a tool which has special adaptabilities for use in connection with fire extinguishing apparatus, and particularly fire extinguishing apparatus in which a long length of hose is supported on a suitable rack in immediate proximity to or joined with fixed mains or stand pipes in the building, with a valve interposed between the hose connection and the main or stand pipe whereby the hose may be readily coupled or uncoupled or the valves operated to turn on or off the water supply. In apparatus of the character described the valves and couplings are allowed to remain for long periods without any use whatsoever and hence the threads of the couplings and the valve stems become set or corroded, so that they cannot be easily manipulated or manipulated at all by hand, without some mechanical appliance for increasing the manual power.

The present tool is designed for use either in connecting or disconnecting the couplings or for opening or closing the valves, and in practice it is designed that the tool shall be permanently connected with the fire apparatus by a flexible chain or other connection which will permit of a sufficient range of movement for using the tool in the manner designed, but which will prevent it from being stolen or carried away by thoughtless persons.

The invention consists in a spanner for hose pipe couplings embodying certain novel details of construction and combinations and arrangements of parts, adapting it for the purpose stated, all as will be hereinafter described and pointed out particularly in the appended claims.

In the accompanying drawings: Figure 1 is a perspective view of a tool embodying the present improvements. Fig. 2 is a view looking at one end of the tool to illustrate the formation of the hose coupling engaging part of the same. Fig. 3 is an edge elevation; Fig. 4 is a side elevation, one end of the tool being shown in section; and Fig. 5 is a view illustrating the use of the tool for opening and closing a valve.

Like letters of reference in the several figures indicate the same parts.

The tool is conveniently formed of metal which may be cast, if so desired, and subsequently finished off to give it an attractive appearance, and embodies in its construction a handle portion A of convenient length and transverse dimensions to afford the necessary strength and grip for the user. At one end the handle portion enlarges and merges into a hose coupling engaging head B, which on its end face, in line with the handle portion A is provided with a curved recess conveniently having a diameter sufficient to enable the recess to fit on the lugs of hose couplings of either large or small diameter, thus adapting the tool for use with couplings of any size. The recess is preferably of such curvature that hose couplings of small diameter will enter the same to the bottom of the recess while hose couplings of large diameter will be engaged by the end portions of the recess. In order that the lugs or projections on such couplings, regardless of the diameter of the couplings, may be properly engaged by the tool for turning the coupling, the end or recessed face of the head is provided with a transversely elongated central opening C which opening at one end tapers or converges toward one side of the head, as at C', and at the other end is made curved or of the full width of the opening. The opening is of sufficient width in its body portion to receive the lugs or projections on a hose pipe coupling of the largest diameter and by reason of the tapering or converging walls at one end of said opening the lugs or projections on hose pipe couplings of all diameters will wedge into the opening as the tool is turned about the coupling and cause the tool to cling as it were, so that the full leverage obtainable by the use of the tool may be utilized to effect the turning movement, without liability of the tool slipping off.

Conveniently the extremities of the opening C are substantially radial to the curve of the recess in the end face and said opening may merge into edge and side openings $C^2$, C³, whereby the head of the tool is rendered light and the possibility of dirt accumulating therein is eliminated. Furthermore, when used in situations where mud or ice is liable to accumulate in the opening it may be readily knocked out from either side or end so that the tool can not be rendered inoperative or unusable in any situation where it may be needed. At the end opposite the head the handle is provided with projections forming jaws adapted to engage the ordinary wheels or hand pieces applied to valve stems for turning the same. Inasmuch as such wheels or hand pieces are ordinarily of two varieties, one having spokes and a rim, and the other having a solid interior web with openings therein, the valve operating portion of the tool is provided with projections forming jaws which will coöperate with either type of valve wheel or hand piece. For coöperation with the type of wheel having a solid web with apertures therein, the tool is provided with a circular projection D on one side, and on the same side with an angular projection D′ spaced from the circular or cylindrical projection a sufficient distance to admit the rim portion of the wheel when the circular projection D is placed in the opening in the web. On the opposite side of the handle end, two projections are provided, lettered E and E′, respectively, having their proximate faces slightly curved, but substantially at right angles to the axis of the handle and adapted for the reception of the rim of the wheel or one of the spokes of the wheel when the tool is to be used as a lever for turning valves having spoked wheel or hand pieces. By the provision of the projections D′ and E′ the tool will operate very much as would a wrench or gripper, for the sharp edges of the projections D′ and E′ will tend to bite into the rim portion so as to effectually prevent the slipping of the tool when pressure is applied for turning the valve. The end projections D and E form a T-head at one end of the handle, and inasmuch as they are both rounded on their outer faces they form a smooth bearing for the hand when the wrench is used as a spanner for setting up or unscrewing the couplings of a hose pipe.

In use the tool is applied to the rotary rim of a hose pipe coupling as is an ordinary spanner, and owing to the converging walls at the end of the longitudinal opening it will grip the lugs or projections on the coupling, regardless of the particular size of the coupling or projection and will, therefore, not tend to slip off when power is applied for rotating it.

Assuming that the couplings of the fire extinguishing apparatus have been made and it is desired to open the valve, the tool is reversed in the hand and one or the other of the projections D or E inserted in the wheel or hand piece with the projection D′ or E′ on the outside of the rim. In this position the tool may be used as a long lever for turning the valve stem, the manual power being so much increased by the use of the tool as a lever that any one is enabled to either connect or disconnect the hose pipe couplings or to open or close the valve. In other words, the tool enables such parts to be manipulated even though they may have remained in inoperative position until corroded or stuck so as to effectually resist any attempt to move the same by manual power without the use of the tool.

What is claimed is:

1. A spanner for hose pipe couplings embodying a handle, a head integral therewith, the intermediate portion of the face of the head being recessed transversely of the axis of the handle, said head having an elongated central aperture merging into side and edge openings, the end walls of the recess intersecting the end portions of the face of the head at an acute angle and one end of said recess being provided with converging walls whereby hose pipe coupling lugs of different diameters may be gripped.

2. A spanner for hose pipe couplings, embodying a handle, a head integral therewith at one end and having a curved recess extending transversely of the axis of the handle, said recess having a central elongated opening with converging walls at one end for the reception of and coöperation with the lugs or projections on a hose pipe coupling.

3. A spanner for hose pipe couplings, embodying an elongated handle having a head at one end integral therewith, said head having its end face provided with a curved recess arranged transversely of the axis of the handle, said recess having an elongated central aperture merging into side and edge openings, the end walls of the recess being radial to the center of the curved recess and one end of said recess being provided with converging walls for gripping hose pipe coupling lugs of differing diameters.

HENRY J. M. HOWARD.

Copies of this patent may be obtained for five cents each, by addressing the "Commissioner of Patents, Washington, D. C."